United States Patent [19]

Charlton et al.

[11] 3,872,310

[45] Mar. 18, 1975

[54] DETECTION OF CORROSION BY A RADIOMETRIC TECHNIQUE

[75] Inventors: John Stuart Charlton; John Francis Ross, both of Stockton-on-Tees, England

[73] Assignee: Imperial Chemical Industries Limited, London, England

[22] Filed: Feb. 13, 1973

[21] Appl. No.: 332,114

[30] Foreign Application Priority Data
Feb. 17, 1972   United Kingdom ............... 7426/72

[52] U.S. Cl. .............................................. 250/358
[51] Int. Cl. ........................................... G01t 1/16
[58] Field of Search ........... 250/358, 359, 360, 306, 250/308

[56] References Cited
UNITED STATES PATENTS
2,501,174   3/1950   Herzog ................................. 250/360
2,702,864   2/1955   McKee ................................. 250/360

*Primary Examiner*—Archie R. Borchelt
*Assistant Examiner*—Davis L. Willis
*Attorney, Agent, or Firm*—Cushman, Darby & Cushman

[57] ABSTRACT

Apparatus and method for detecting corrosion in boiler tubes. The tube wall thickness of each tube is measured in situ in the bundle using a radioisotopic method. The degree of corrosion thus indicated is plotted on a diagram in a way which highlights the corroded tubes.

1 Claim, 3 Drawing Figures

PATENTED MAR 18 1975  3,872,310

DETECTION OF CORROSION BY A RADIOMETRIC TECHNIQUE

The present invention relates to the detection of corrosion in tubes using a radioisotopic method and to apparatus for carrying out that method.

Corrosion of metal tubes, for example boiler tubes, is well known as a hazard in operations involving the tubes. Methods have been evolved to monitor the corrosion and to provide a warning either at the onset of corrosion or at the point when corrosion has so advanced that further operations would be undesirable and/or potentially dangerous. One method which can provide an indication of corrosion is a determination of the thickness of the wall of the tube. A comparison of the thickness of the tube wall after it has been used for some time with its thickness before use or with the thickness of an identical, unused, tube wall will provide a measure of the degree of corrosion which has occurred. Radioisotopic techniques have been used to measure the thickness of tube walls. For example, a radioactive source and a detector are placed on opposite sides of the tube wall and the absorption of radioactivity by the wall determined. The absorption is a function of the wall thickness.

In the radiation absorption methods used at present, only one tube can be tested at a time. Moreover, where a number of tubes in the one piece of equipment are being examined for corrosion, e.g. tube bundles in boilers, it has been necessary to remove tubes individually from the bundle for examination in order to obtain access with the source and detector to both the interior and the exterior of the tube. We have now devised a method and an apparatus for carrying out that method which enables the thickness of a tube wall to be assessed in situ, even when surrounded by other tubes.

Accordingly, the present invention is a method for assessing the thickness of one or more tube walls in a bundle which consists of at least two parallel tubes, which comprises inserting a radioactive source into a first tube, and inserting a radiation detector for radioactivity into a second tube adjacent the first, measuring the absorption of radiation by the intervening walls of the pair of tubes and comparing the measurement with a standard measurement representing a known thickness of the material of which the tubes are made.

The radioactive source may be positioned in each tube of the bundle in turn, the radiation detector inserted successively into each of the immediately adjacent tubes and the absorption in each such adjacent tube measured. In this way a considerable number of absorption measurements may be obtained, depending on the number of tubes in the bundle. A diagram illustrating the configuration of the bundle is drawn and each absorption is marked on the diagram in a way which illustrates the degree of corrosion indicated by the absorption measurement. For example, a line may be drawn between the two tubes concerned in an absorption measurement, the colour of the line corresponding to the degree of corrosion indicated by the absorption measurement. For example, black, blue and red lines may be used to indicate little or no corrosion, moderate corrosion, and severe corrosion respectively. A tube on the diagram which is surrounded predominantly by red and blue lines has a wall which is at least moderately corroded. A tube surrounded entirely by black lines has a wall which is probably almost uncorroded.

A further form of the invention consists of an apparatus for carrying out the method of the invention and comprising a radioactive source and a radiation detector each located on substantially parallel arms, the arms being linked at or near adjacent ends by a connecting piece. Preferably the parallel arms are of adjustable length. Preferably also, the connecting piece is itself adjustable so as to vary the distance apart of the parallel arms.

The apparatus of the invention enables the source and detector to be easily positioned at equivalent positions in tubes for a series of absorption measurements. In addition, in the preferred form of apparatus the distance of the source and detector along their respective tubes can be simultaneously varied. Adjustability of the connecting piece enables the apparatus to be readily used with any bundle of tubes whatever the spacing of the tubes from one another.

In addition, positioning-sections of various diameters attached both to the source and to the detector arms may suitably be used to enable the source and detector to be accurately maintained in axial positions in boiler tubes of differing diameters.

The adjustability of both the source-detector separation and the width of the arms enables the apparatus to be used in a wide range of tube bundle types.

A modified form of apparatus according to the invention comprises a radioactive source and up to six radiation detectors, the source and each detector being located on substantially parallel arms of adjustable length, the arms carrying the detectors being displaced around the arm carrying the source as a centre, and all the detector arms being linked at or near adjacent ends to the source arm by connecting pieces which are themselves adjustable so as to vary the distance apart of the parallel arms. The arms carrying the detectors may be individually detachable so that any number up to six of the tubes adjacent the tube containing the radioactive source may be simultaneously inspected, as desired. The arms carrying the detectors are conveniently equally displaced around the arm carrying the source as a centre. The use of apparatus having six detector arms enables simultaneous inspection to be carried out of the six tubes immediately surrounding the tube containing the radioactive source in a tube bundle of substantially triangular pitch. Using this modified form of the apparatus enables the diagram illustrating the absorption of each tube to be completed more quickly than is the case using apparatus with only one detector arm.

The invention is further described with reference to the accompanying drawings in which.

Figures 1, 2:
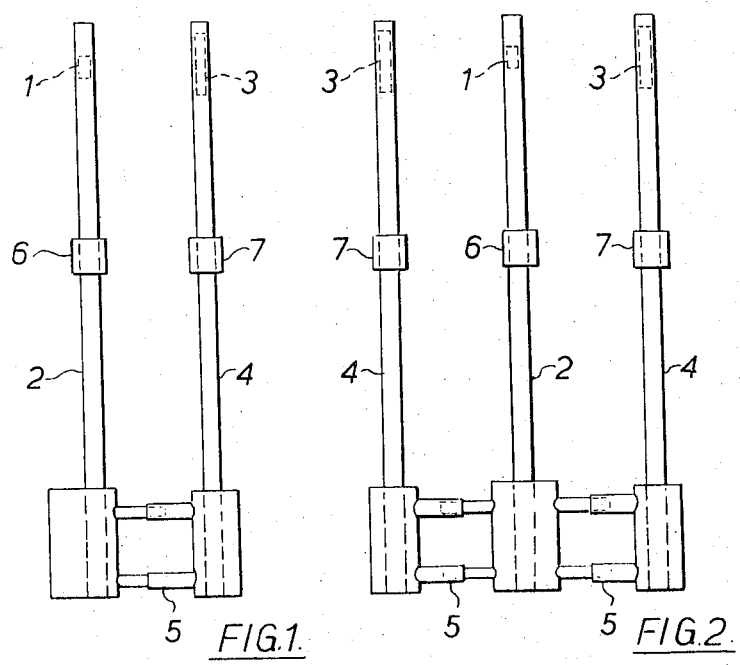
FIG. 1 illustrates one embodiment of apparatus according to the invention.
FIG. 2 illustrates a further embodiment of apparatus according to the invention.

Referring to FIG. 1, a radioactive source 1 is removably located on an adjustable arm 2 and a detector 3 for radiation is similarly located on a parallel adjustable arm 4. The arms are conveniently made from stainless steel. The arms 2 and 4 are linked at adjacent ends by a telescopic connecting piece 5, which enables the distance apart of the arms 2 and 4 to be varied.

Cylindrical positioning-sections 6 and 7 enable the source 1 and detector 3 to be axially positioned in the tubes. The positioning-sections 6 and 7 are readily detachable and may be replaced by positioning-sections of different diameters, thus enabling a good fit of the arms 2 and 4 in tubes of different diameters to be maintained.

Referring to FIG. 2, a radioactive source 1 is removably located on an adjustable arm 2 and two detectors 3 for radiation are similarly located, one on each of parallel adjustable arms 4. The arms 4 are linked to arm 2 at adjacent ends by telescopic connecting pieces 5, enabling the distances apart of each of the arms 4 from arm 2 to be independently varied.

Cylindrical positioning-sections 6 and 7 enable the source 1 and detectors 3 respectively to be axially positioned in the tubes.

The embodiment of the apparatus according to FIG. 2 enables absorptions in tubes to be determined rather more quickly than the simpler apparatus according to FIG. 1.

Figure 3:
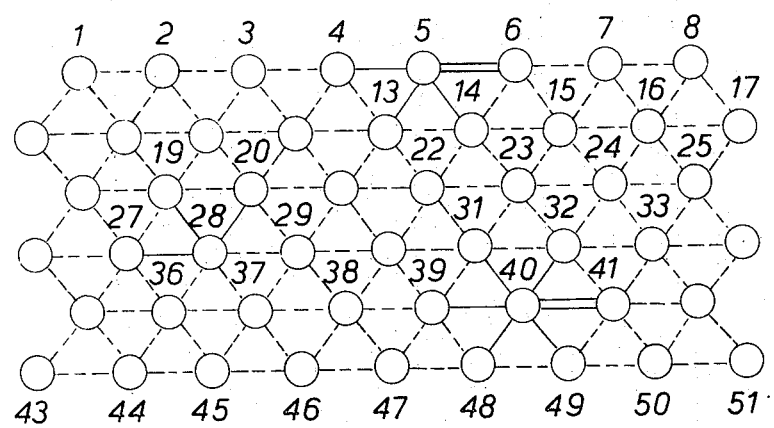
FIG. 3 is a diagram of a group of tubes in which the degree of corrosion of pairs of tube walls indicated by the absorption measured is represented on the diagram by viarious dotted and dashed lines.

The apparatus of FIG. 1 was used to assess the wall thickness of the tubes of a tube bundle such as is shown diagrammatically in FIG. 3. In a first series of measurements, the source was inserted in tube No. 16 and the detector was inserted in turn in tubes Nos. 7, 8, 15, 17, 25 and 24. In each case the absorption was measured and found to be substantially the same for each pair of tubes, corresponding to less than 10 percent corrosion of the tube walls. In a second series of measurements the source was inserted in tube No. 6 and the detector in turn in tubes Nos. 5, 7, 14 and 15. In one case, when the detector was in tube No. 5, the absorption was substantially lower than in the other three cases corresponding to corrosion greater than 50 percent in the walls of tubes 5 and 6. In the other three cases corrosion between 10 and 30 percent was indicated. Clearly tube No. 5 and/or tube No. 6 is corroded. In the next series of measurements, the source was inserted in tube No. 14, and the detector was inserted in turn in tubes Nos. 5, 6, 13, 15, 22 and 23. The absorption measurement obtained when the detector was in tube No. 5 was substantially lower than in the other five cases and corresponded to 30 to 50 percent corrosion. With the detector in tube 6 corrosion between 10 and 30 percent was indicated. The measurements were repeated in this fashion for each tube in the tube bundle. On the diagram coloured lines were drawn between each pair of tubes to represent the degree of corrosion of the walls of these tubes indicated by the absorption measurements. The colour code used in practice and the corresponding dotted and dashed line code used in FIG. 2 are as follows:

| Combined Corrosion of tube walls | Colour code | Code used in FIG. 2 |
| --- | --- | --- |
| < 10% | Black | ... |
| 10% to 30% | Green | - - - |
| 30% to 50% | Blue | — |
| > 50% | Red | = |

At the conclusion of the measurements, the diagram had the appearance corresponding to that shown in FIG. 2 in which tubes No. 5, 28, 40 and 41 are clearly identified as being corroded to an extent greater than 10 percent. It is further possible to infer that tubes 5 and 40 are more than 50 percent corroded, tube 28 is 30 to 50 percent corroded and tubes 6 and 41 are 10 to 30 percent corroded.

This method and equipment provide an accurate method of detecting and measuring corrosion in tube bundles. It is a fast method since the time taken for a single measurement is very short and, most importantly, to enable the measurements to be made, it is not necessary as has been the case hitherto, for the tube bundle to be dismantled. When the measurements have been completed on the tube bundle in situ, only the corroded tubes need to be removed.

We claim:

1. A method for the in situ monitoring or detection of corrosion in tubes which in use are subjected to a corrosive medium, by assessing the thickness of one or more tube walls in a bundle which consists of at least two parallel tubes, said method comprising emitting a radioactive emission from a plurality of tubes in a bundle in turn, detecting the emission in each of the immediately adjacent tubes, thereby measuring the absorption of radiation in each such adjacent tube, and comparing the measurement with a standard measurement representing a known thickness of the material of which the tubes are made wherein the degree of corrosion of each tube is indicated on a diagram illustrating the configuration of the bundle by markings which correspond to the amount of absorption measured.

* * * * *